US012778024B2

(12) United States Patent
Schlichting

(10) Patent No.: US 12,778,024 B2
(45) Date of Patent: Nov. 3, 2026

(54) AGRICULTURAL BALER

(71) Applicant: AGCO International GmbH, Neuhausen (CH)

(72) Inventor: Malte Cornelius Schlichting, Wolfenbuttel (DE)

(73) Assignee: AGCO International GmbH, Neuhausen (CH)

( * ) Notice: Subject to any disclaimer, the term of this patent is extended or adjusted under 35 U.S.C. 154(b) by 683 days.

(21) Appl. No.: 18/164,267

(22) Filed: Feb. 3, 2023

(65) Prior Publication Data

US 2023/0270050 A1 Aug. 31, 2023

(30) Foreign Application Priority Data

Feb. 28, 2022 (GB) ...................................... 2202703

(51) Int. Cl.
*A01F 15/07* (2006.01)
*A01F 15/10* (2006.01)

(52) U.S. Cl.
CPC ............ *A01F 15/071* (2013.01); *A01F 15/10* (2013.01); *A01F 2015/076* (2013.01); *A01F 2015/108* (2013.01)

(58) Field of Classification Search
CPC .. A01F 15/071; A01F 15/10; A01F 2015/076; A01F 2015/108; A01F 15/0715
See application file for complete search history.

(56) References Cited

U.S. PATENT DOCUMENTS 7,883,010 B2 2/2011 Sasazaki
8,776,679 B1 7/2014 Henry et al.
10,926,908 B2 2/2021 Schlichting
11,205,337 B1 12/2021 Derscheid et al.
2009/0107349 A1* 4/2009 Noonan ................ A01F 15/071 40/305
2013/0305658 A1 11/2013 Smith et al.
2017/0057680 A1* 3/2017 Schlichting ........ G06K 7/10425
2017/0287303 A1 10/2017 Lang et al.
2018/0016047 A1 1/2018 Miyamoto et al.
2019/0124850 A1* 5/2019 Okamura ................ A01F 15/00

FOREIGN PATENT DOCUMENTS

CN 212891201 U 4/2021

OTHER PUBLICATIONS

European Patent Office, Search Report for related EP Application No. EP23155815, dated Sep. 8, 2023, 8 pages.
UK Intellectual Property Office, Search report for related UK Application No. GB2202703.1, dated Aug. 17, 2022, 3 pages.

* cited by examiner

*Primary Examiner* — Kito R Robinson
*Assistant Examiner* — Kevin Jerome Harvey, II

(57) ABSTRACT

A control system for controlling a cutting operation performed by at least one controllable components of an agricultural baler on a wrapping material incorporating a plurality of electronic identifiers is disclosed. The control system generates a cutting strategy that ensures that an electronic identifier is not damaged when the cutting operation is performed. if the determined cutting strategy determines that the severing apparatus would interfere with the first electronic identifier or the adjacent electronic identifiers, a control signal is generated causing an increase in a number wrapping material layers or a decrease in a number of wrapping material layers compared to a number of wrapping material layers the baler would apply if no control signal were generated.

20 Claims, 3 Drawing Sheets

AGRICULTURAL BALER

FIELD

The present invention relates to an agricultural round baler, and in particular to improvements in the apparatus for binding of formed round bales within a baling chamber of the agricultural round baler.

BACKGROUND

It is known to provide a reservoir of a binding material to bind or wrap a formed bale within an agricultural baler. It is also generally desirable to trace the origin of bales produced by an agricultural baler. To this end, it is known to provide a binding or wrapping material with RFID tags or other electronic identifiers. Typical binding materials include baler twine, typically for balers producing square bales and film or net wrapping for binding or wrapping round bales within a baling chamber of round baler prior to ejection of the formed bale from the baling chamber.

Each bale may have multiple electronic identifiers with unique serial numbers, such that a unique identifier is associated with each formed bale. Information about the bale can also be associated with the electronic identifier, either directly by storing the information on the electronic identifiers or indirectly by associating each unique identifier with the information in a database. Such a database can be stored and accessed from any suitable location such as cloud storage or other memory storage. Example information may include, but is not limited to, bale weight, moisture content, geographical location from which the harvested crop was baled, time of baling, number of knives used in processing the harvested crop, kind of wrapping material used.

Typically, the electronic identifiers are incorporated in the binding material during manufacture at a fixed distance from one another, typically every 6 meters along the length of the wrapping material.

Given the reliance upon the information associated with each bale, it is important that the identifiers do not become damaged during the baling operation. One potential source of such damage is the severing apparatus, and in particular a severing knife or blade, used to sever the binding material being wrapped around the formed bale from the wrapping material being dispensed from the reservoir of wrapping material.

It is an advantage of the present invention that the problem of inadvertent damage to the electronic identifier by the severing apparatus is addressed.

BRIEF SUMMARY

According to a first aspect of the present invention, a control system for controlling a cutting operation performed by one or more operational components of an agricultural baler on a wrapping material incorporating a plurality of electronic identifiers, the control system comprising one or more controllers, and being configured to:

- receive data indicative of a position of a first electronic identifier;
- receive data indicative of the distance between adjacent electronic identifiers;
- determine, in dependence on the position of at least a first electronic identifier and the distance between adjacent electronic identifiers, a cutting strategy for performing the cutting operation; and
- generate and output one or more control signals for controlling one or more operational components associated with the baler in dependence on the determined cutting strategy.

Preferably the cutting strategy comprises one of:

- increasing the number of preset wrapping material layers; or
- decreasing the number of preset wrapping material layers; or
- neither increasing or increasing the number of preset wrapping material layers.

Preferably, the one or more operational components comprises a user interface operable to communicate information indicative of the determined cutting strategy to an operator of the agricultural baler. More preferably, the control system is configured to generate and output the one or more control signals for controlling operation of the user interface to communicate the information indicative of the determined cutting strategy to an operator of the agricultural baler.

Preferably, the one or more operational components further comprises a severing apparatus for operation in accordance with the determined cutting strategy. More preferably, the control system is configured to generate and output the one or more control signals for automatically controlling the severing apparatus to sever the wrapping material during a baling operation.

Preferably, the control system is configured to:

- receive position data from an electronic identification system associated with the agricultural baler; and
- determine a cutting strategy in dependence thereon.

More preferably the electronic identification system comprises a reader of the electronic identifier.

Preferably, the electronic identification system is mounted or otherwise coupled to the agricultural baler and configured to monitor electronic identifiers passing into a baling chamber of the agricultural baler.

Preferably, the control system is configured to receive a user input indicative of a position of a first electronic identifier provided by an operator of the agricultural baler and determine the cutting strategy in dependence thereon.

According to a second aspect as system for controlling a cutting operation performed by one or more controllable components of an agricultural baler on a wrapping material, comprises:

- a severing apparatus for severing wrapping material passing into a baling chamber of an agricultural baler; and
- a control system according to the first aspect configured to control operation of the severing apparatus and/or the wrapping apparatus in accordance with a determined cutting strategy.

According to third aspect, an agricultural baler comprises and/or is controllable by the control system of the first aspect, or comprises the system of the second aspect.

According to a fourth aspect, a method of controlling operation of one or more controllable components of an agricultural baler, comprises:

- receiving data indicative of data indicative of a position of a first electronic identifier;
- determining, in dependence on the position of a first electronic identifier, a cutting strategy for performing the cutting operation; and
- generating and outputting one or more control signals for controlling one or more operational components associated with the agricultural baler in dependence on the determined cutting strategy.

According to a fifth aspect a computer readable program comprises instructions which, when the program is executed by a computer, causes the baler of the third aspect to implement the method of the fourth aspect.

Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

The invention will now be described, by way of example only, with reference to the accompanying drawings, in which.

and

Figure 6:
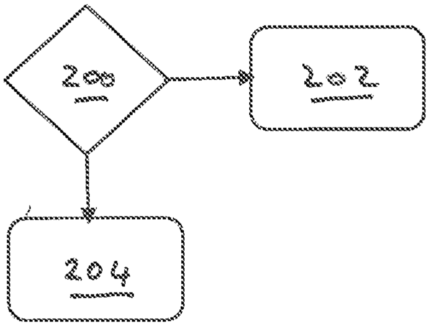

FIG. 6 shows a flow chart illustrating the method of the present invention.

DETAILED DESCRIPTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
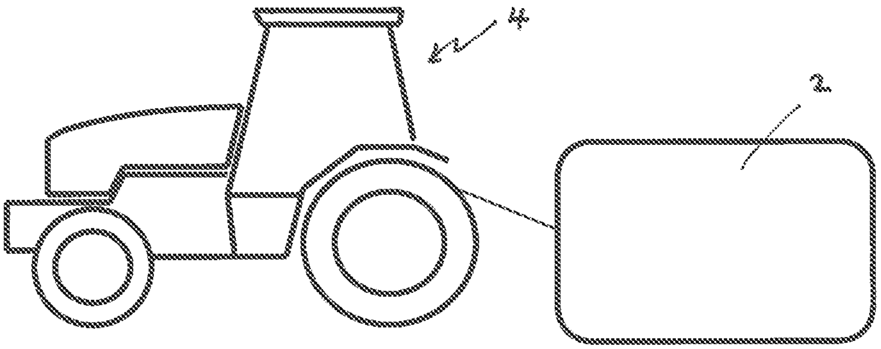
FIG. 1 shows a schematic side view of a round baler and a towing vehicle.

With reference to FIG. 1, an agricultural baler 2 is shown connected to an agricultural towing vehicle 4, such as a tractor. Typically, the agricultural baler 2 is connected to a Power Take Off (PTO) of the towing vehicle 4 in order to drive operational elements of the agricultural baler 2. In a round baler for producing bales in a fixed diameter baling chamber, the baling chamber being largely defined by a plurality of suitably arranged roller, the PTO connection may be used to drive a number of the rollers forming part of the baling chamber. In a round baler 2 having a baling chamber of variable diameter, the PTO connection may be used to power driven rollers driving the endless belts forming the baling chamber. The towing vehicle 4 is also conveniently provided with a terminal having a user interface 60 by which information relevant to the operation of the towing vehicle 4 and the round baler 2 may be communicated to an operator within the towing vehicle 4.

Electrical power may be taken from the towing vehicle 4 or from a power source carried on the baler 2 and used to power operation of various operational elements of the baler 2.

Figure 2:
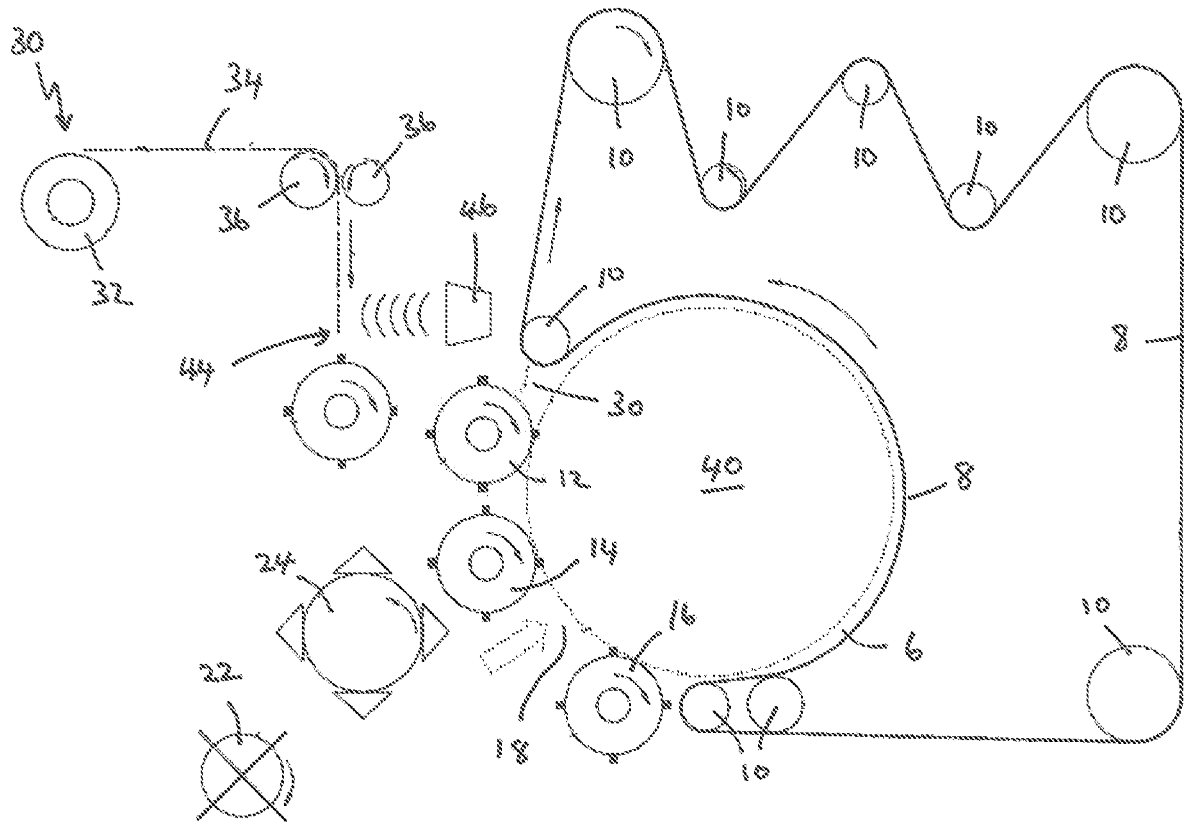
FIG. 2 shows a schematic side view of elements of an agricultural baler for use with the present invention.

Aspects of an example variable chamber round baler are shown in FIG. 2. A baling chamber 6 is defined in part by a series of endless belts 8 wound about a plurality of rollers 10. The rollers 10 comprise both driven and idler rollers, the position of some of the rollers being varied to control the size of the baling chamber 6. The baling chamber 6 is further defined by a pressing roller 12 and first and second starter rollers 14, 16. A crop inlet 18 is defined between the first and second starter rollers 14, 16 and a wrapping material inlet 30 is defined between the pressing roller 12 and the endless belts 8.

In use, as the baler 2 is towed along a windrow or swath of harvested crop, a rotating pick up unit 22 of the baler 2 gathers up harvested crop and directs the harvested crop to a rotating conveyor rotor 24, the conveyor rotor 24 directing the gathered crop through the crop inlet 18 into the baling chamber 6 of the round baler.

The baler 2 further includes a reservoir 30 in which at least one roll 32 of wrapping material 34 is located. While only a single roll of wrapping material is shown, the reservoir 30 may contain rolls of more than one kind of wrapping material to allow an operator to change out the wrapping material depending upon the harvested crop to baled as the operator moves between fields having different crops to be baled. In use, the wrapping material 34 extends from the reservoir to a feed apparatus.

In the illustrated embodiment, the feed apparatus comprises a pair of feed rollers 36 and a web supply roller 38.

When a bale 40 of suitable size has been formed in the baling chamber 6, the feed apparatus is actuated to feed a free end of the wrapping material 34 to the wrapping material inlet 20, from where the wrapping material 34 is drawn into the baling chamber 6 to wrap the formed bale 40. In the illustrated embodiment, the feed rollers are actuated to draw the wrapping material from the reservoir and into contact with the web supply roller 38. The web supply roller 38 is driven so as direct a free end of the wrapping material 34 toward the rotating pressing roller 12. The feed apparatus may also be arranged to keep the wrapping material under a desired tension as the wrapping material is drawn into the baling chamber. In the illustrated embodiment, this is achieved by controlling the speed of the feed rollers 36.

Once the formed bale has been sufficiently wrapped, a severing mechanism 42 is actuated to sever the wrapping material 34 such that a first free end 44 is created within the baler 2 (for wrapping or binding of the next formed bale) and a second free end is drawn into the baling chamber 6 to complete wrapping of the formed bale 40.

Figure 3:
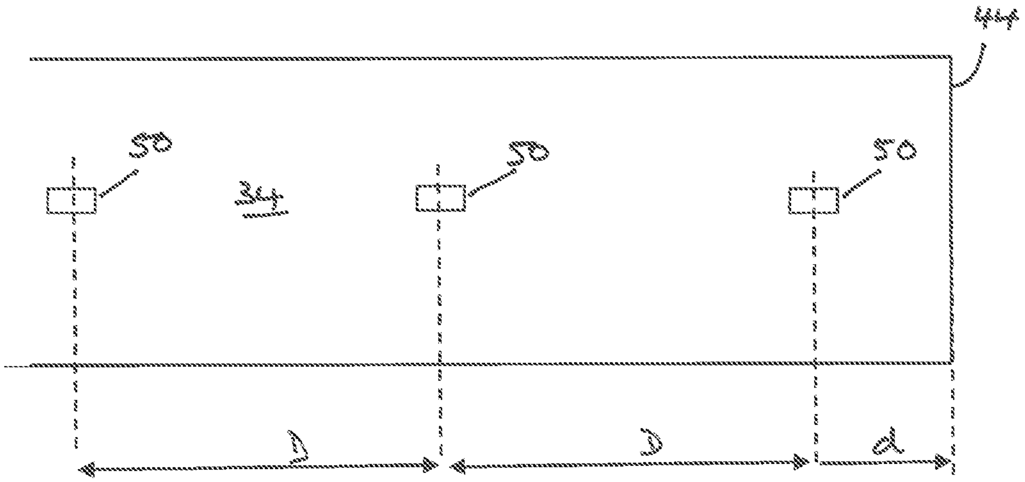
FIG. 3 shows a free end of a length of a wrapping material.
Figure 5:
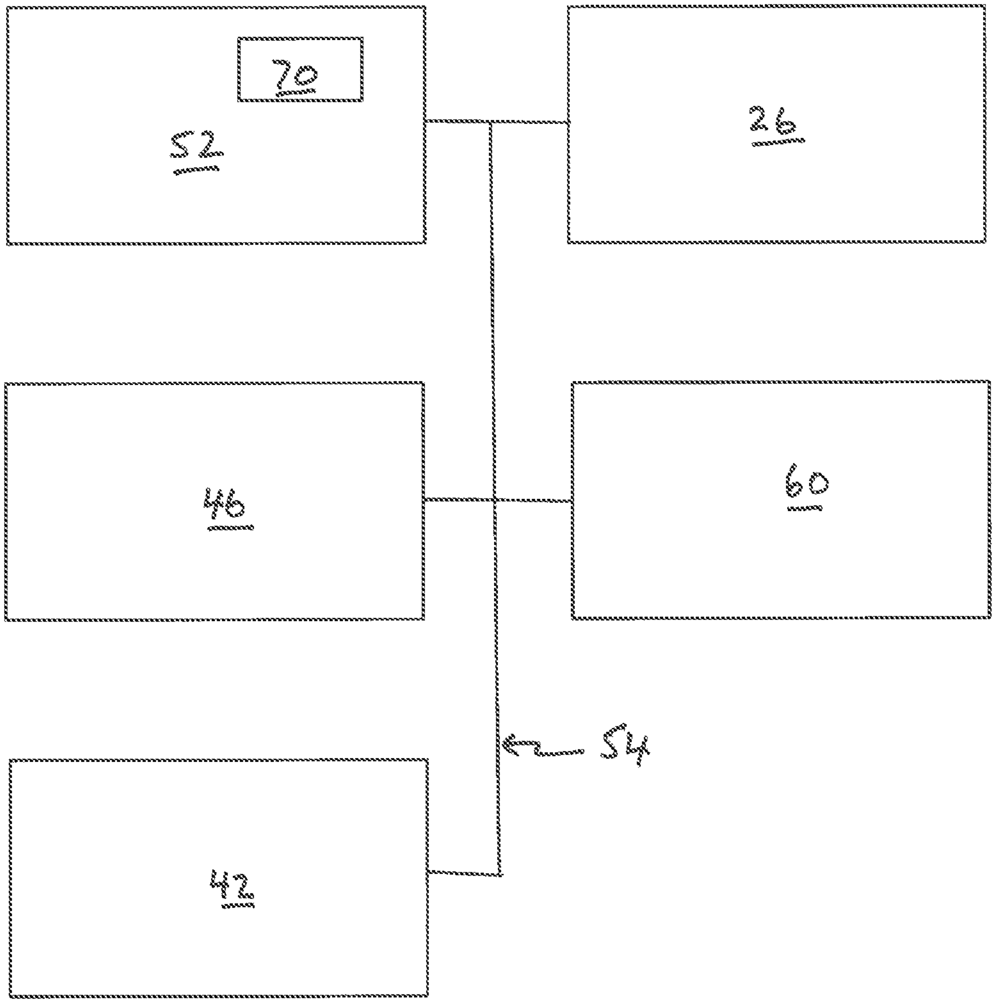
FIG. 5 shows a schematic diagram illustrating elements of the agricultural baler.

As best shown in FIG. 3, the wrapping material 34 is provided with a plurality of electronic identifiers 50. The electronic identifiers 50 are regularly spaced a distance D from one another. An electronic identifier 50 is spaced a distance d from the free end 44 of the wrapping material 34.

The baler 22 is further provided with an electronic identification system in the form of a reader 46 for reading of the electronic identifiers 50 forming part of the wrapping material 34. The reader 46 is advantageously located adjacent a free portion of a path of the wrapping material 34. In this way the reader 46 is able to read and identify each electronic identifier 50, such as an RFID tag, as it passes the reader 46.

The baler 2 is typically provided a control unit 52. The control unit 52 may comprise one or more processors. The processor (or processors) may be located on the baler 2 and be in communication with one or more processors located elsewhere (for example on the towing vehicle 4 or remote from the baler/towing vehicle combination). The various processors may communicate with one another over a network 54 by any suitable means.

The control unit 52 is in communication with apparatus adapted to calculate the length of wrapping material 34 consumed from the reservoir. This information is used to ensure that a certain number of layers of wrapping material 34 are wrapped around the formed bale 40. Such apparatus may include apparatus to measure the number of rotations of the feed rollers 36, or as explained further below, the number of electronic identifiers 50 passing the reader 46.

Accidental damage to the electronic identifiers 50 may be avoided by the use of a suitable cutting strategy.

Figure 4:
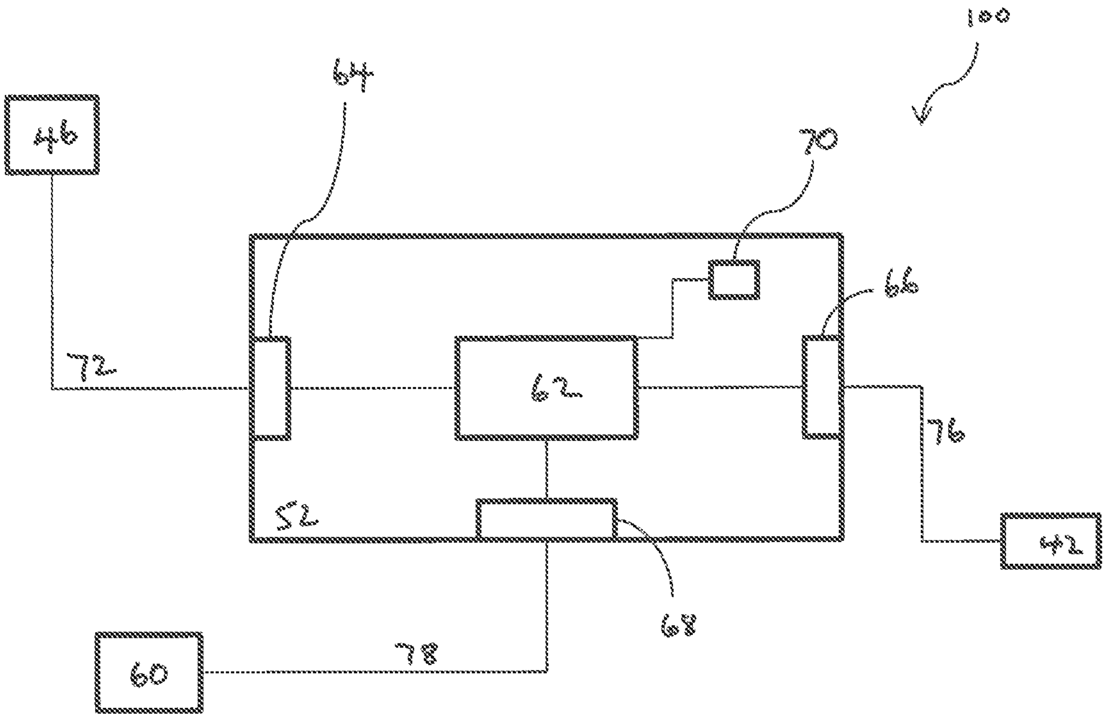
FIG. 4 shows a schematic diagram illustrating an embodiment of a control system in accordance with the invention.

As shown in FIG. 4, an example control system 100 comprises a control unit 52 having an electronic processor 62 associated with the baler 2, and electronic inputs 64 and electronic outputs 66, 68. The processor 62 is operable to access a memory 70 associated with the control unit 52 and execute instructions stored therein to perform the steps and functionality of the present invention, e.g. by controlling the user interface 60, to indicate, e.g. to an operator of the baler 2, information indicative of the operation of the baler 2 including information regarding consumption of the wrapping material 34 and/or a degree of wrapping of the formed bale 40 in the baling chamber 6.

The control unit 52 is operable to receive sensor data via input 64 which, in the illustrated embodiment, takes the form of input signals 72 received from the reader 46. Utilising this data, the processor 62 is configured to analyse the data and determine therefrom information regarding the wrapping of the formed bale 40. In particular, this information is used to determine a cutting strategy for the baler 2.

As described above, the control unit 52 includes an electronic output 66 configured to output control signals 74 generated by the processor 62 for controlling operation of the severing apparatus 42. Specifically, processor 62 is operable to generate, and the control unit 52 operable to then output via output 68, control signals 76 for controlling operation of the severing apparatus 42 as determined by the cutting strategy. As will be appreciated, the control unit 52 may output the control signals 76 to a local processing unit, for controlling operation of the severing apparatus 42.

Output 68 is operably coupled to the user interface 60 of the baler 2. Here, the control system 100 is operable to control operation of the user interface 60, e.g. through output of control signals 78 in order to display data to an operator of the baler 2 relating to the operation of the control system 100. Specifically, the control system 100 is operable to control the user interface 60 to communicate to the operator an indicator of the cutting strategy, for example by displaying information regarding consumption of the wrapping material 34 and/or a degree of wrapping of the formed bale 40 in the baling chamber 6, and/or whether any adjustment to the degree of wrapping of the formed bale 40 has been required.

Example 1

A fresh roll 32 of wrapping material 34 is loaded into the baler 2. Information about the distance d to the first electronic identifier 50 and the separation distance D of subsequent electronic identifiers 50 is known. For example, such information may be provided by the manufacturer of the wrapping material. The operator inputs this information into the system, for example by entering the information into the user terminal 60 in the tractor 4 or by entering the information into application software on a mobile telephone or similar apparatus.

One of the processors then calculates, taking account of the diameter of the formed bale 40 in the baling chamber 6 and desired number of layers of wrapping material 34, whether on actuation of the severing apparatus 42 an electronic identifier 50 will be in the path of the severing apparatus (or within a predefined distance of the cut) (step 200, FIG. 6). The processor 52 can then adjust the timing of the actuation of the severing apparatus 42 within a predetermined threshold to increase or decrease the number of layers of wrapping material 34 and so avoid severing of the wrapping material 34 in the region of the electronic identifier 50 (step 202). If no adjustment is required, the processor 52 actuates the severing apparatus 42 as intended (step 204)

Example 2

When a new roll 34 of wrapping material 34 is loaded into the baler 2, neither the information about the distance d to the first electronic identifier nor the separation distance D of subsequent electronic identifiers 50 is known—or the operator fails to input this information. The reader 46 is adapted to read and note the appearance of each electronic identifier and supply this data to the processor 52 so that the separation distance D of electronic identifiers (given the speed of the wrapping material) can be calculated and this information then used to determine the length of wrapping material 34 entering the baling chamber 6 and so the degree of wrapping of the formed bale 40.

The processor 52 is also provided with the location of the severing zone (where along the path of the wrapping material 34 the wrapping material is cut), for example in relation to the position of the reader 46 or the position of the wrapping material inlet 20 and is able to calculate whether, when the severing apparatus 42 is actuated given the speed of the wrapping material 34 and the last signal indicative of an electronic identifier 50, an electronic identifier 50 will be in the path of the severing apparatus 42 (or within a predefined distance of the cut). The processor 52 can then adjust the actuation of the severing apparatus 42 within a predetermined threshold to increase or decrease the number of layers of wrapping material 34 and so avoid severing of the wrapping material 34 in the region of the electronic identifier 50.

Example 3

A fresh roll of wrapping material 34 is loaded into the baler 2. As in Example 1, information about the distance to the first electronic identifier 50 and the separation distance D of subsequent electronic identifiers 50 is known. Instead of actuating the severing apparatus 42 based upon the total length of wrapping material 34 dispensed as in Example 1, the severing apparatus 42 is instead actuated based upon the known separation distance D of the electronic identifiers 50 and monitoring the number of such electronic identifiers 50 detected—this being proportionate to the number of layers of wrapping material to be applied to the formed bale 40. The processor 52 can then adjust the actuation of the severing apparatus 42 in order to sever the wrapping material 34 at a known interval from a reading of an electronic identifier 50 in order to avoid damage to a subsequent electronic identifier 50.

Reading of the electronic identifiers 50 in this way also allows the processor(s) 52 to calculate when the roll of wrapping material 34 will be exhausted and need replacement, for example by counting the electronic identifiers 50 and comparing to a known number of electronic identifiers 50 on a full roll 32 of wrapping material 34.

Further, should an operator need to swap between rolls of wrapping material, for example between a roll of netwrap and a roll of plastics film, due to a preference for a different kind of wrapping material when wrapping a formed bale of a different crop material, the processor(s) 52 can store the details of the last detected electronic identifier 50 for a partially consumed roll of wrapping material in an associated memory or display relevant details to an operator such that the operator can input these details if called upon at a later time. Such relevant details may include the number of electronic identifiers 50 and meterage of wrapping material 34 already used, the number of electronic identifiers 50 remaining (and corresponding meterage of wrapping material 34 remaining).

Alternatively, the processor 52 records in the memory 70 the identity of the last electronic identifier 50 identified on a roll 32. If the roll 32 is not changed then, since serial numbers of electronic identifiers are incremental (where the electronic identifier is an RFID tag), when the baler 2 resumes use of the partially consumed roll 32 of wrapping material 34, the processor 52 can refer to the memory 70 and pick up the wrapping process where it left off without the need for the operator to enter the data.

All references cited herein are incorporated herein in their entireties. If there is a conflict between definitions herein and in an incorporated reference, the definition herein shall control.

From reading the present disclosure, other modifications will be apparent to persons skilled in the art. Such modifications may involve other features which are already known in the field of forage harvesters and component parts therefore and which may be used instead of or in addition to features already described herein.

What is claimed is:

1. A control system for controlling a cutting operation performed by one or more operational components including a severing apparatus of an agricultural baler on a wrapping material incorporating a plurality of electronic identifiers, the control system comprising one or more controllers, and being configured to:

receive data indicative of a position of a first electronic identifier;

receive data indicative of a distance between adjacent electronic identifiers;

determine, in dependence on the position of at least a first electronic identifier and the distance between adjacent electronic identifiers, a cutting strategy for performing the cutting operation to avoid severing of the wrapping material in the region of an electronic identifier; and generate and output one or more control signals for controlling one or more operational components associated with the baler in dependence on the determined cutting strategy if the determined cutting strategy determines that the severing apparatus would interfere with the first electronic identifier or the adjacent electronic identifiers, the one or more control signal causing an increase in a number wrapping material layers or a decrease in a number of wrapping material layers compared to a number of wrapping material layers the baler would apply if no control signal were generated.

2. The control system as claimed in claim 1, wherein the cutting strategy further comprises neither increasing nor decreasing the number of preset wrapping material layers if the cutting strategy determines that the severing apparatus would not interfere with the first electronic identifier or the adjacent electronic identifiers.

3. The control system as claimed in claim 1, wherein the one or more operational components further comprises a user interface operable to communicate information indicative of the determined cutting strategy to an operator of the agricultural baler.

4. The control system as claimed in claim 3, configured to generate and output the one or more control signals for controlling operation of the user interface to communicate the information indicative of the determined cutting strategy to an operator of the agricultural baler.

5. The control system of claim 1, wherein the one or more operational components further comprises a severing apparatus for operation in accordance with the determined cutting strategy.

6. The control system as claimed in claim 5, configured to generate and output the one or more control signals for automatically controlling the severing apparatus to sever the wrapping material during a baling operation.

7. The control system as claimed in claim 1, configured to:

receive position data from an electronic identification system associated with the agricultural baler; and determine a cutting strategy in dependence thereon.

8. The control system as claimed in claim 7, wherein the electronic identification system further comprises a reader of the electronic identifier.

9. The control system as claimed in claim 7, wherein the electronic identification system is mounted or otherwise coupled to the agricultural baler and configured to monitor electronic identifiers passing into a baling chamber of the agricultural baler.

10. The control system as claimed in claim 1, configured to receive a user input indicative of a position of a first electronic identifier provided by an operator of the agricultural baler and determine the cutting strategy in dependence thereon.

11. A system for controlling a cutting operation performed by at least one controllable components of an agricultural baler on a wrapping material, further comprising:

a severing apparatus for severing wrapping materials passing into a baling chamber of an agricultural baler; and a control system as claimed in claim 1 configured to control operation of the severing apparatus and/or the wrapping apparatus in accordance with a determined cutting strategy to avoid severing of the wrapping material in the region of an electronic identifier.

12. An agricultural baler further comprising the system of claim 11.

13. A method of controlling operation of one or more controllable components including a severing apparatus of an agricultural baler, comprising:

receiving data indicative of data indicative of a position of a first electronic identifier on a wrapping material incorporating a plurality of electronic identifiers;

determine, in dependence on the position of a first electronic identifier, a cutting strategy for performing a cutting operation to avoid severing of the wrapping material in the region of the electronic identifier; and generate and output one or more control signals for controlling one or more operational components associated with the agricultural baler in dependence on the determined cutting generate and output one or more control signals for controlling one or more operational components associated with the baler in dependence on the determined cutting strategy if the determined cutting strategy determines that the severing apparatus would interfere with the first electronic identifier or the adjacent electronic identifiers, the one or more control signals causing an increase in a number wrapping material layers or a decrease in a number of wrapping material layers compared to a number of wrapping material layers the baler would apply if no control signal were generated.

14. The method as claimed in claim 13, wherein the cutting strategy further comprises neither increasing nor decreasing a number of preset wrapping material layers if the cutting strategy determines that the severing apparatus would not interfere with the first electronic identifier or the adjacent electronic identifiers.

15. The method as claimed in claim 13, wherein the one or more operational components further comprises a user interface operable to communicate information indicative of the determined cutting strategy to an operator of the agricultural baler.

16. The method as claimed in claim 15, configured to generate and output the one or more control signals for controlling operation of the user interface to communicate the information indicative of the determined cutting strategy to an operator of the agricultural baler.

17. The method of claim 13, wherein the one or more operational components further comprises a severing apparatus for operation in accordance with the determined cutting strategy.

18. The method as claimed in claim 17, configured to generate and output the one or more control signals for automatically controlling the severing apparatus to sever the wrapping material during a baling operation.

19. The method as claimed in claim 13, further comprising:

receiving position data from an electronic identification system associated with the agricultural baler; and determining a cutting strategy in dependence thereon.

20. The method as claimed in claim 19, wherein the electronic identification system is mounted to the agricultural baler and configured to monitor electronic identifiers passing into a baling chamber of the agricultural baler.

* * * * *